J. P. LUTHER, H. D. CHEMBERLIN & N. De GROFF.
DRAFT-ATTACHMENT.

No. 181,955. Patented Sept. 5, 1876.

WITNESSES:
E. Wolff
John Goethals

INVENTOR:
J. P. Luther
H. D. Chemberlin
N. De Groff
BY
ATTORNEYS.

UNITED STATES PATENT OFFICE.

JUSTUS P. LUTHER, HARRISON D. CHEMBERLIN, AND NELSON DE GROFF, OF BERLIN, WISCONSIN.

IMPROVEMENT IN DRAFT ATTACHMENTS.

Specification forming part of Letters Patent No. 181,955, dated September 5, 1876; application filed June 26, 1876.

*To all whom it may concern:*

Figure 1:
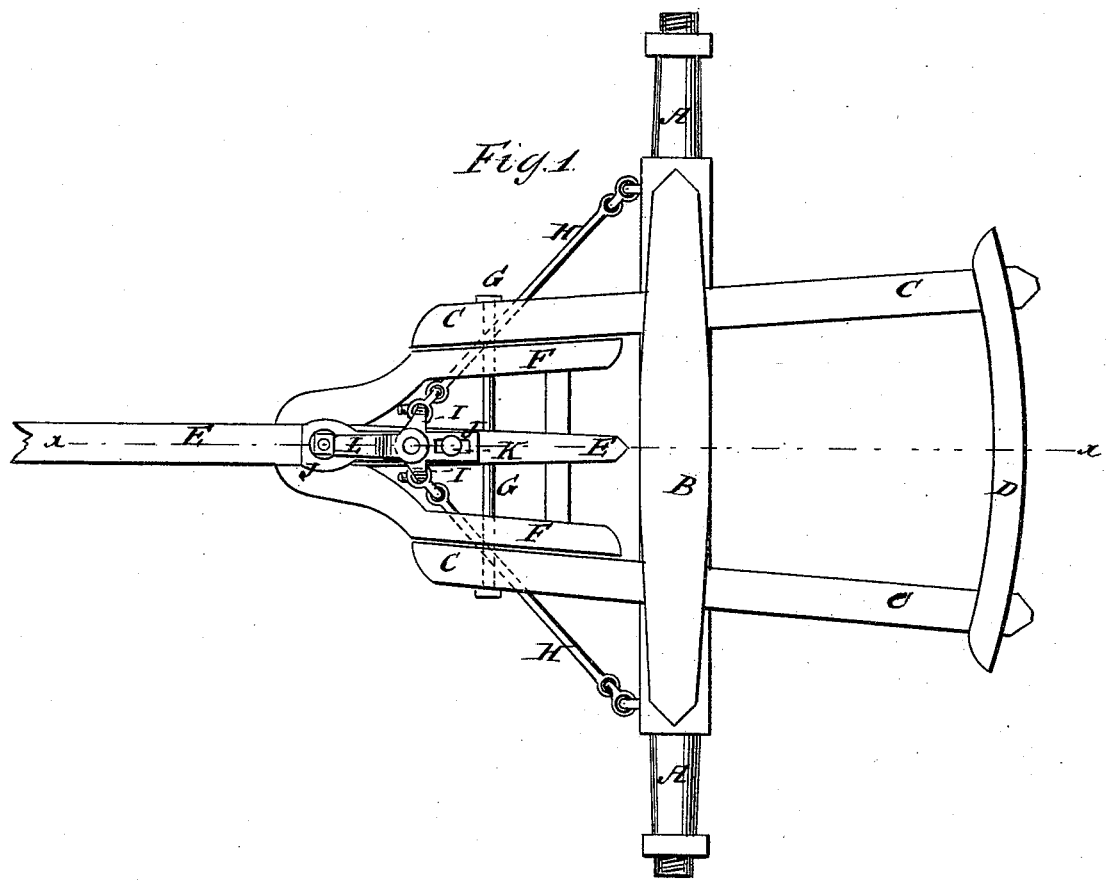
Figure 2:
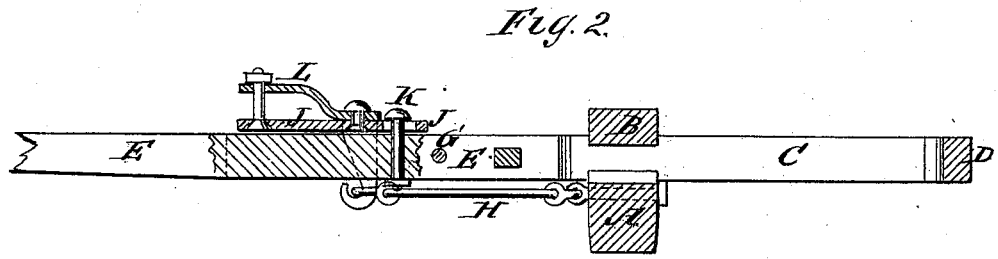

Be it known that we, JUSTUS P. LUTHER, HARRISON D. CHEMBERLIN, and NELSON DE GROFF, of Berlin, in the county of Green Lake and State of Wisconsin, have invented a new and useful Improvement in Wagons, of which the following is a specification:

Figure 1 is a top view of the forward part of the running gearing of a wagon to which our improvement has been applied. Fig. 2 is a vertical longitudinal section of the same taken through the line $x\ x$, Fig. 1.

Similar letters of reference indicate corresponding parts.

The object of this invention is to furnish wagons which shall be so constructed that they may be guided by the draft of the team, that the draft of both horses may be thrown upon the wheel that meets an obstruction, and that will prevent the tongue from vibrating.

The invention will first be described in connection with drawing, and then pointed out in the claim.

A is the forward axle. B is the forward bolster. C are the forward hounds. D is the sway-bar. E is the tongue. F are the tongue-hounds, and G is the bolt by which the tongue E and tongue-hounds F are pivoted to the hounds C.

To the forward side of the end parts of the axle A are pivoted the rear ends of two chains or bars, H, the forward ends of which are pivoted to the arms I, formed upon the side edges of the draw-bar J, and projecting downward upon the opposite sides of the tongue E.

The draw-bar J is laid upon the upper side of the rear part of the tongue, and its rear part is slotted longitudinally to receive the bolt K, by which it is secured and pivoted to said tongue.

To the middle part of the draw-bar J is riveted the hammer-strap L, between the forward end of which and the forward end of the draw-bar J is pivoted the double-tree. This construction gives an advantage of leverage when one wheel strikes an obstruction, and the draft of both horses is thrown upon one wheel.

Our device is intended to equalize the draft and steer the wagon, so as to do away with the movement of tongue when one wheel strikes a stone. This is obtained by the leverage secured through the difference in distance from draw-bolt to arms, and arms to slot. The forward end of draw-bar, being loose, is drawn toward the obstructed wheel, and the bar is caused to slide on the pin in the slot, thereby loosening the chain on the opposite side from the wheel obstructed, and giving a quartering draft to the team. This throws the direct draft of both horses upon the wheel obstructed, and lifts it over the obstruction.

We are aware that it is not new to use slotted hounds in connection with draw-bar; but this leaves a loose tongue, which cannot guide the course of wagon on a down grade, while it compels the use of hounds.

In our invention the tongue cannot swing laterally, no hounds are necessary, and the tongue is left uncut.

What we claim is—

The combination, with tongue and bolt K, of the draw-bar J, arranged on top of tongue, and slotted to receive said bolt, substantially as and for the purpose specified.

JUSTUS P. LUTHER.
HARRISON D. CHEMBERLIN.
NELSON DE GROFF.

Witnesses:
L. EICHSTAEDT,
W. B. ARNOLD.